Jan. 5, 1932.  A. P. ROBINSON  1,839,704
SLIDABLE WIND DEFLECTOR
Filed Jan. 13, 1931   3 Sheets-Sheet 2
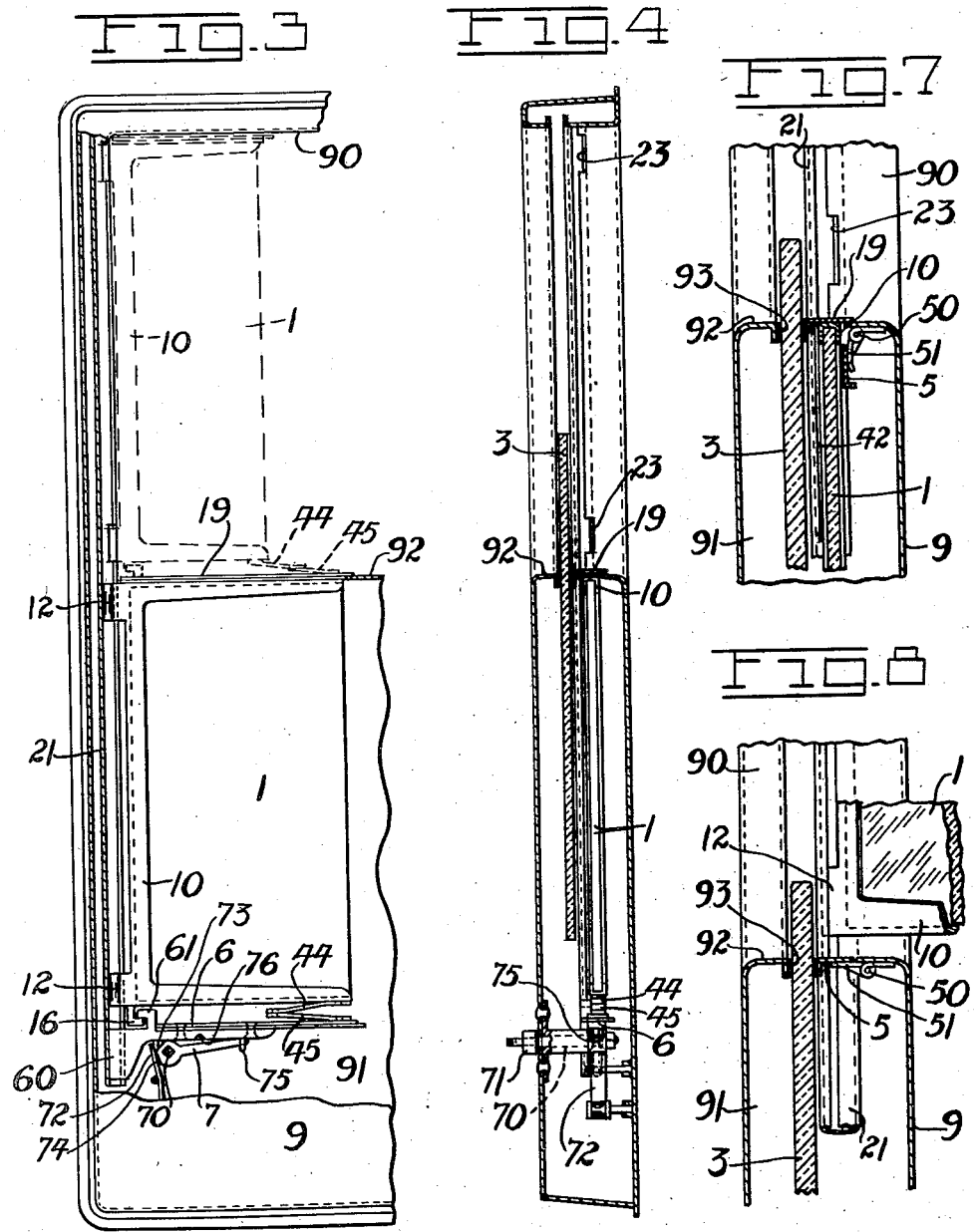
Inventor
Albert P. Robinson
By Charles L. Reynolds
Attorney

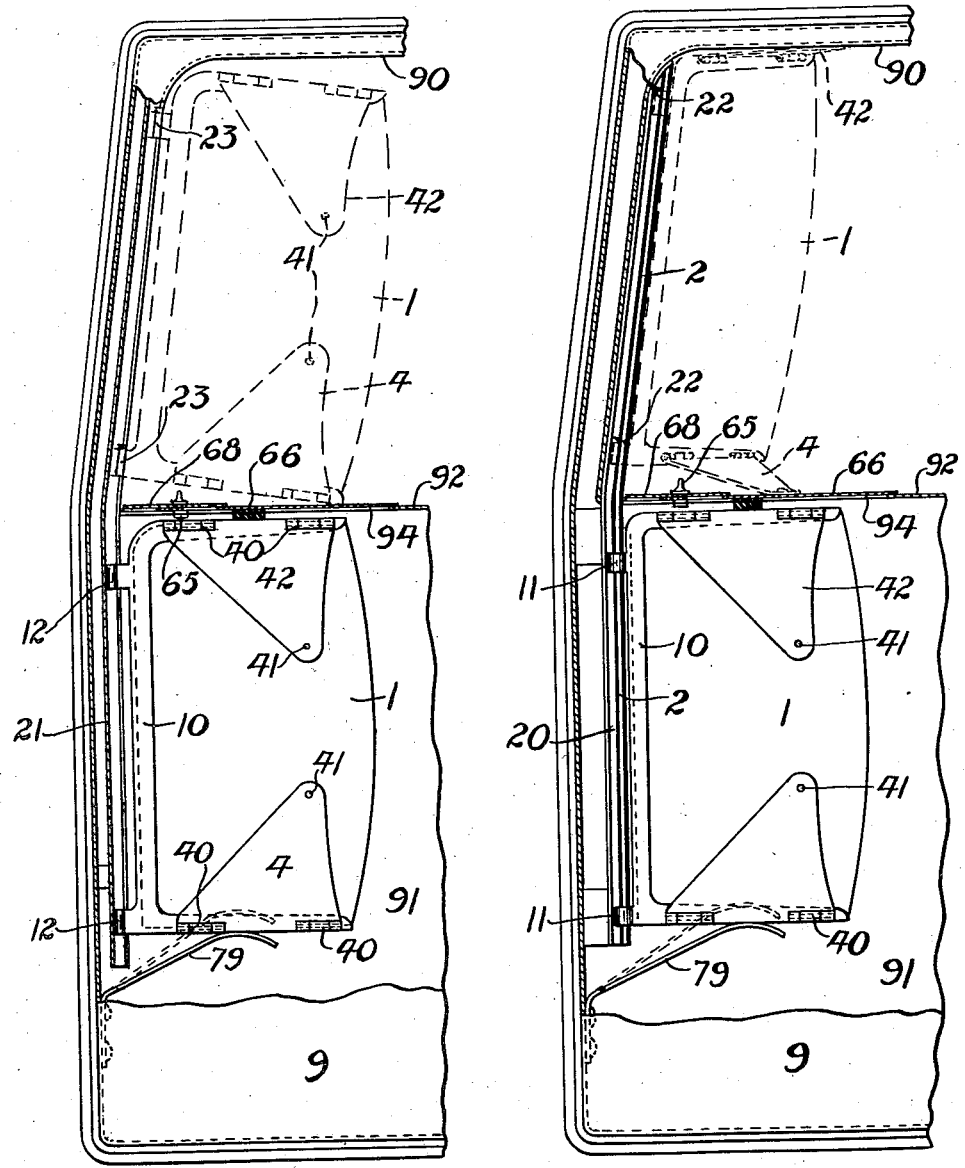

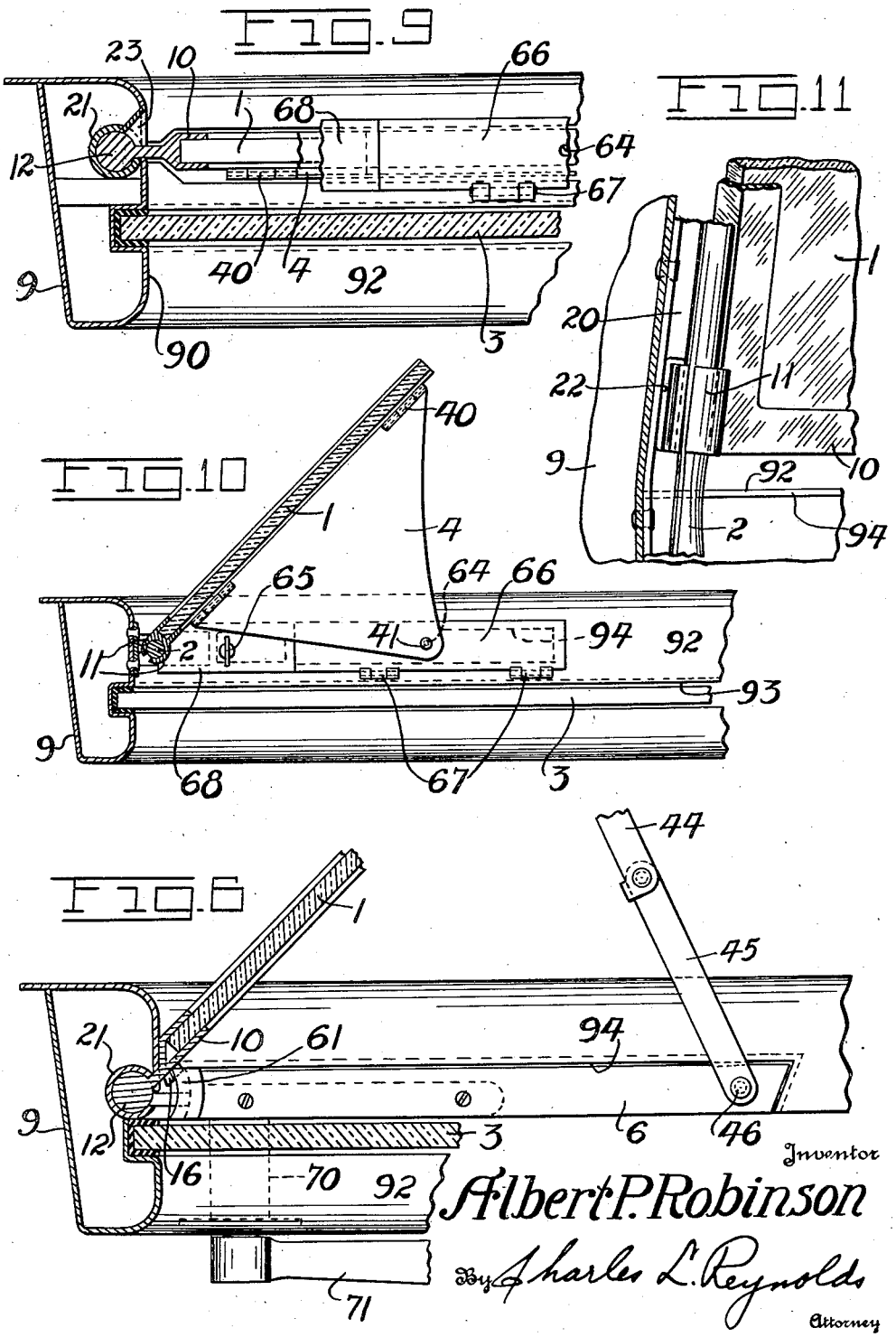

Patented Jan. 5, 1932

1,839,704

UNITED STATES PATENT OFFICE

ALBERT P. ROBINSON, OF SEATTLE, WASHINGTON

SLIDABLE WIND DEFLECTOR

Application filed January 13, 1931. Serial No. 508,409.

My invention relates to wind deflectors for use upon automobiles, and which are intended to be used in conjunction with and as a supplement to the ordinary drop windows. Usually such deflectors are mounted upon the front doors. My invention is an improvement upon the deflector and the supporting and controlling means therefor as shown in my application Serial No. 396,996, filed October 3, 1929.

The wind deflector mounting of the former case was adapted for use upon doors wherein the front edge is straight, but automobiles are now being designed wherein the front edge of the door breaks at the level of the sill and extends angularly upwardly and rearwardly from that point. In consequence, it is not possible to slide a deflector vertically upward into upraised position, from which upraised position it is swung outwardly into operative position, and it is one of the objects of my present invention to provide a mounting for the deflector which will permit it to move about such an angle as may be found in the later designs, and yet to be firmly and substantially supported in its operative position.

It is a further object to provide means which will automatically close the slot through which the deflector is withdrawn from the storage chamber, when the deflector has reached its upraised position, in some cases moving with the deflector, and which will maintain that slot closed until the deflector is again to be stored away, and will then open the slot to permit the passage of the deflector.

A further object is to provide in a device of this general character a means for bracing the deflector in its operative position, and to provide a means whereby such bracing may be between the deflector and the slot closure referred to above.

It is a further object to provide a simple means whereby such an assembly may be moved from its inoperative position into position where it may be readily drawn upward into upraised position.

Other objects, and more especially such as refer to the structural details of my invention, will be better ascertained from a study of the attached drawings (wherein my invention is shown embodied in forms which are now preferred by me), of this specification, and of the claims which terminate the same.

My invention comprises the novel parts and the novel combinations and arrangements thereof, as shown in the accompanying drawings, described in the specification, and as will be particularly defined in the claims.

Figure 1 is an inside elevation of the front edge of an automobile door, with parts broken away and shown in section, illustrating my invention incorporated in such a door, and Figure 2 is a similar view with a slightly modified form of guide means, showing parts in the inoperative position.

Figure 3 is a view similar to Figure 1, showing a slightly modified arrangement of slot closure means, and Figure 4 is a transverse vertical section thereof, showing parts in the relationship shown in Figure 3.

Figure 5 is a detail elevation of the connection between the deflector and the slot closure, and the elevating means.

Figure 6 is a transverse section on a horizontal plane, showing the connection between the deflector and the slot closure.

Figure 7 is an enlarged section similar to Figure 4, illustrating details of the arrangement, but with a further modified form of slot closure, and Figure 8 is a similar view, showing parts in the operative position.

Figures 9 and 10 are views similar to Figure 6, showing parts in the inoperative and operative positions, respectively, but showing the slot closure means of Figures 1 and 2.

Figure 11 is a detail side elevation of the guide means illustrated in Figure 2.

The door, generally designated by the numeral 9, has a window aperture 90 in its upper portion, and a storage chamber 91 beneath the sill 92 of the window aperture. The forward edge of the door may be straight, as seen in Figure 3, or it may be angled as seen in Figures 1 and 2. Through a slot 93 in the sill 92 a drop window 3 is slidable from the storage chamber 91 into position to close the window aperture 90.

The sill 92 may be provided with another aperture or slot 94, outwardly of the slot 93 and window 3, through which is slidable a wind deflector 1, which ordinarily would be formed of glass, supported in a U-shaped frame 10. This deflector is guided, by means which I shall describe hereafter, for movement through this second slot 94 from the storage chamber 91 into registry with the window aperture 90, which is its upright position, and it is then capable of being swung outwardly into operative position, inclined rearwardly and outwardly from the forward edge of the window aperture.

To permit the deflector to be guided for vertical movement, especially if it must pass about an angle, as shown in Figures 1, 2, and 11, I prefer that the frames 10 be provided with spaced guide means, one at the top and one at the bottom, and that the forward edge of the window aperture have a complemental guide means extending down into the storage space with which the guides upon the top and bottom of the deflector frame may be engaged. It is largely a matter of choice whether the members upon the deflector embrace the guide upon the door or the reverse. In Figures 2, 10 and 11, I have shown bracket fingers 11 embracing the beaded edge 2 of a flange 20, which projects from the forward edge of the window aperture 90, and which extends thence downwardly into the storage chamber 91 to an extent sufficient to permit the deflector to be entirely received within that storage chamber, the brackets 11 still engaging the flange 20 and the bead 2. On the other hand, in Figures 1, and 3 to 9, inclusive, there is shown a beaded finger 12, at the top and bottom of the frame 10, which is received within a slotted tube 21 which is either formed as a part of or is set into the forward edge of the window aperture 90, and which extends downward below the sill 92 to an extent such that the deflector may be entirely withdrawn within the storage chamber 91.

In either case, it will be noted that the embracing members fit closely to the parallel sides of the narrow supporting web of the complemental member, and thus closely embracing the complemental member, its swinging is prevented, and the deflector, in consequence, must be drawn upward and will always be maintained, while being drawn upward, in its own plane. Because of the support at two spaced points only, it may pass about the angle. When it reaches its upright position, means are provided to permit its swinging, and these may comprise, by way of example, the aperture 22 in the web 20, as may be seen in Figures 2, 10, 11, or a notch 23 in the outer edge of the tube 21, which receives the beaded end of the bracket 12. When the complemental parts reach the position indicated by the aperture 22 or the notches 23, they will permit the deflector to be swung outwardly, and if means are provided to retain it in this outwardly swung operative position, the interengagement of these members in this position will support the deflector and prevent its dropping.

Various means may be provided to hold the deflector swung outwardly in operative position. I may provide a vane 4, which is shown as pivoted upon the bottom of the frame 10 at 40, and which is provided with a hole 41 fitting over a complemental button upon the sill. A similar vane 42 may be employed at the top, all as made clear in my application referred to above, and these vanes, being pivoted, may be swung into a plane alongside of the deflector so that they may move with the wind wing through the slot 94. When in operative position, they will prevent the passage of drafts under and over the edges of the deflector. Alternatively, the holding means may comprise a pair of toggle arms 44 and 45, one of which is pivotally secured to the frame 10 and the other of which is pivotally secured at the sill, as may be seen in Figures 3, 4 and 6.

It is quite necessary that the slot 94 be closed at all times to prevent the dropping into it of débris, such, possibly, as a lighted cigarette butt. This may be conveniently arranged when the deflector is in its inoperative position, by securing to that edge of the frame 10 which is then uppermost a flange 19 which overlies and closes this slot 94; see Figure 7. When the deflector is in its operative position a gate 5, which may be pivotally supported at 50 within the storage space 91 alongside of the slot 94, may be caused to swing up by virtue of a spring 51 incorporated in its hinge, and it will thus close the aperture, as may be seen in Figure 8, but will be depressed again when the deflector is moved downward into its inoperative position, and will then take the position shown in Figure 7.

As another means of closing the slot 94 when the deflector is in its upraised or operative position, I may provide a closure 6, which is guided for movement within the storage chamber 91 by a means 60 in all respects similar to those means which guide the frame 10. It is connected to the deflector, to be raised thereby, by such means as the interengaging fingers 16 and 61, which cause the closure 6 to be drawn upward with the deflector, but permit swinging of the deflector relative to the closure without disengagement of these fingers.

As another means of closing the slot 94, I may provide the gate 66 (see Figures 9 and 10) pivoted at 67 upon the sill, and provided, if desired, with a slidable section 68, which may be moved longitudinally of the gate 66 into contact with the guide bead 2, or like member. In instances where this us used, it will also serve to close the slot 94 when the deflector has been withdrawn into the storage chamber, and a catch 65 will retain it closed.

The vane 4 and the toggle arms 44 and 45, or rather, the latter arm, may be secured to the sill, when the deflector is in operative position, or preferably, to such slot closure means as may be provided. Thus, as may be seen in Figure 6, the toggle arm 45 is pivoted at 46 upon the closure 6, and is not disengaged therefrom. Upon breaking the toggle, the arms will lie in the plane of the deflector and of the closure 6, and will move vertically therewith. In Figure 10, the button 64, with which the aperture 41 of the vane is engaged, is carried upon the closure gate 66.

It is necessary that some means be provided for raising the deflector slightly when it is desired to move it from the storage chamber. This may be done by the spring 79, as seen in Figures 1 and 2, or positive means may be provided, such as the arm 7 (see Figures 3 and 5) secured upon a transverse rock shaft 70, to which is secured, within the automobile, a handle 71, by means of which the driver may swing the arm 7 from the horizontal position of Figure 3 to the upraised position of Figure 5. As a means of temporarily holding parts in this upraised position, the end of the arm 7 may engage within a notch 76 in the under side of the closure 6. A flat spring 72, adapted to seat against flat surfaces 73 and 74 upon the head of the arm 7, tends to hold the arm upraised, in position to be engaged again when the deflector is lowered, or down; by providing a loop 75 upon the closure 6, within which the end of the arm 7 may engage, the spring 72 acting through the arm and loop may tend to hold the closure and deflector down, and to prevent rattling.

What I claim as my invention is:

1. In combination with an automobile door having a window aperture with a slotted sill and a storage chamber therebeneath, a window glass slidable from the storage chamber into the window aperture, a wind deflector disposed outwardly of the window glass and movable vertically from a level below the sill into upraised position in registry with the window aperture, and cooperating guide means supporting the forward edge of the deflector from the door throughout its vertical movement constraining it to movement in its own plane, and permitting movement of the deflector into outwardly swung operative position, only after it has reached upraised position.

2. In combination with an automobile door having a window aperture and a storage chamber therebeneath, a window glass slidable from the storage chamber into the window aperture, a wind deflector disposed outwardly of the window glass and movable vertically from within the storage chamber into upraised position in registry with the window aperture, a guide extending along the forward edge of the window aperture and into the storage chamber, complemental guide means upon the forward edge of the deflector engaged with said first guide, and constrained thereby to movement of the deflector in its own plane, without swinging, said first guide being interrupted at positions with which the guide means upon the deflector register when the deflector is in upraised position, to then permit outward swinging of the deflector into operative position.

3. In combination with an automobile door having a window aperture and a storage chamber therebeneath, a window glass slidable from the storage chamber into the window aperture, a wind deflector disposed outwardly of the window glass and movable vertically from within the storage chamber into upraised position in registry with the window aperture, a guide extending along the forward edge of the window aperture and into the storage chamber, complemental guide means upon the forward edge of the deflector engaged with said first guide, and constrained thereby to movement of the deflector in its own plane, without swinging, said first guide being interrupted at positions with which the guide means upon the deflector register when the deflector is in upraised position, to then permit outward swinging of deflector into operative position, and means for bracing the deflector in outwardly swung operative position.

4. In combination with an automobile door having a window aperture with an inclined forward edge and a storage chamber beneath the aperture, a window glass movable from the storage chamber into the window aperture, a wind deflector disposed outwardly of the window glass and movable in a vertical plane from within the storage chamber into upraised position in registry with the window aperture, a guide bent to follow the inclined forward edge of the window aperture and to extend downward into the storage chamber, and a pair of guides upon the forward edge of the deflector and complementally engaged with the first guide means at two spaced points, to guide the deflector for movement from the storage chamber into upraised position and then into outwardly swung operative position.

5. The combination of claim 2, the guide upon the edge of the window aperture comprising a longitudinally slotted tube recessed within the door structure, and the guide means upon the deflector comprising arms having beads thereon received in said tube, the arms fitting the slot for sliding movement, and being restrained thereby from swinging movement, and notches formed in the outer edge of the slot, the arms registering therewith when the deflector is in upraised position, whereby the deflector may swing outwardly into operative position.

6. The combination of claim 2, the guide upon the edge of the window aperture comprising a beaded flange upon the forward edge of the window aperture and extending into the storage space, and the guide means upon the deflector comprising slotted tubular brackets embracing the bead of the flange, and engaging the flange at each side to restrain the deflector from swinging movement, the flange being apertured at positions in registry with the brackets when the deflector is in upraised position, whereby the deflector may swing outwardly into operative position.

7. In combination with an automobile door having a window aperture with a slotted sill and a storage chamber therebeneath, a window glass slidable from the storage chamber into the window aperture, a wind deflector disposed outwardly of the window glass and movable vertically through the sill from within the storage chamber into upraised position in the window aperture, cooperating guide means supporting the forward edge of the deflector from the door throughout its vertical movement, constraining it to movement in its own plane, and permitting movement of the deflector into outwardly swung operative position only after it has reached upraised position, and means interengageable between the deflector and its guide means, when the deflector is swung outwardly into operative position, for supporting the deflector.

8. In combination with an automobile door having a slotted window aperture and a storage chamber therebeneath, a window glass slidable from the storage chamber into the window aperture, a wind deflector disposed outwardly of the window glass and movable vertically through the slot from within the storage chamber into upraised position in the window aperture, and cooperating guide means supporting the forward edge of the deflector from the door, throughout its vertical movement constraining it to movement in its own plane, and permitting movement of the deflector into outwardly swung operative position only after it has reached upraised position, and means interengageable between the deflector and its guide means, when the deflector is swung outwardly into operative position, for supporting the deflector, a slot closure likewise guided for movement from the storage chamber into the deflector slot, and means connecting the deflector and said slot closure to move the latter vertically as the deflector moves vertically, and permitting swinging of the deflector relative to the closure into operative position.

9. In combination with an automobile door having a slotted window aperture and a storage chamber therebeneath, a window glass slidable from the storage chamber into the window aperture, a wind deflector disposed outwardly of the window glass and movable vertically through the slot from within the storage chamber into upraised position in the window aperture, and cooperating guide means supporting the forward edge of the deflector from the door, throughout its vertical movement constraining it to movement in its own plane, and permitting movement of the deflector into outwardly swung operative position only after it has reached upraised position, means interengageable between the deflector and its guide means, when the deflector is swung outwardly into operative position, for supporting the deflector, a slot closure likewise guided for movement from the storage chamber into the deflector slot, means connecting the deflector and said slot closure to move the latter vertically as the wing moves vertically, and permitting swinging of the deflector relative to the closure into operative position, and brace means extending between said slot closure and the deflector for maintaining the latter in operative position.

10. In combination with an automobile door having a slotted window aperture and a storage chamber therebeneath, a window glass slidable from the storage chamber into the window aperture, a wind deflector disposed outwardly of the window glass and movable vertically through the slot from within the storage chamber into upraised position in the window aperture, cooperating guide means supporting the forward edge of the deflector from the door, throughout its vertical movement constraining it to movement in its own plane, and permitting movement of the deflector into outwardly swung operative position only after it has reached upraised position, means interengageable between the deflector and its guide means, when the deflector is swung outwardly into operative position, for supporting the deflector, a slot closure likewise guided for movement from the storage chamber into the deflector slot, and interengaged fingers upon the deflector and closure, adjacent the pivot of the deflector, to draw the closure upward into its slot as the deflector moves upward into upright position, the said fingers being laterally movable relative to one another as the deflector swings outward relative to the closure into operative position.

11. In combination with an automobile door having a slotted window aperture and a storage chamber therebeneath, a window glass slidable from the storage chamber into the window aperture, a wind deflector disposed outwardly of the window glass and movable vertically through the slot from within the storage chamber into upraised position in the window aperture, cooperating guide means supporting the forward edge of the deflector from the door, throughout its vertical movement constraining it to movement in its own plane, and permitting movement of the deflector into outwardly swung operative position only after it has reached upraised position, means interengageable between the deflector and its guide means, when the deflector is swung outwardly into operative position, for supporting the deflector, a slot closure likewise guided for movement from the storage chamber into the deflector slot, means connecting the deflector and said slot closure to move the latter vertically as the deflector moves vertically, and permitting swinging of the deflector relative to the closure into operative position, an arm disposed beneath the closure, when in its lowermost position, and means operable by the occupant of the car to swing said arm upward, thereby to raise the closure and the associated deflector.

12. In combination with an automobile door having a slotted window aperture and a storage chamber therebeneath, a window glass slidable from the storage chamber into the window aperture, a wind deflector disposed outwardly of the window glass and movable vertically through the slot from within the storage chamber into upraised position in the window aperture, cooperating guide means supporting the forward edge of the deflector from the door, throughout its vertical movement constraining it to movement in its own plane, and permitting movement of the deflector into outwardly swung operative position only after it has reached upraised position, means interengageable between the deflector and its guide means, when the deflector is swung outwardly into operative position, for supporting the deflector, a slot closure likewise guided for movement from the storage chamber into the deflector slot, means connecting the deflector and said slot closure to move the latter vertically as the deflector moves vertically, and permitting swinging of the deflector relative to the closure into operative position, an arm disposed beneath the closure, when in its lowermost position, and means operable by the occupant of the car to swing said arm upward, thereby to raise the closure and the associated deflector, and means interengageable between the closure and the arm to maintain the closure and deflector raised.

13. In combination with an automobile door having a slotted window aperture and a storage chamber therebeneath, a window glass slidable from the storage chamber into the window aperture, a wind deflector disposed outwardly of the window glass and movable vertically through the slot from within the storage chamber into upraised position in the window aperture, cooperating guide means supporting the forward edge of the deflector from the door, throughout its vertical movement constraining it to movement in its own plane, and permitting movement of the deflector into outwardly swung operative position only after it has reached upraised position, means interengageable between the deflector and its guide means, when the deflector is swung outwardly into operative position, for supporting the deflector, a slot closure likewise guided for movement from the storage chamber into the deflector slot, means connecting the deflector and said slot closure to move the latter vertically as the deflector moves vertically, and permitting swinging of the deflector relative to the closure into operative position, and a pair of toggle arms, one pivoted to the deflector and the other to the closure, to maintain the deflector at will in operative position.

14. In combination with an automobile door having a window aperture with a slotted sill and a storage chamber therebeneath, a wind deflector and a support therefor, the deflector being movable relative to its support through the slot in the sill from the storage chamber into upraised position, in registry with the window opening, and then outwardly into operative position, and a slot closure operatively connected to the deflector to move therewith into the slot in the sill as the deflector reaches upraised position, and to return into the storage chamber as the deflector moves back through the slot.

15. In combination with an automobile door having a window aperture with a slotted sill and a storage chamber therebeneath, a wind deflector and a support therefor, the deflector being movable relative to its support through the slot in the sill from the storage chamber into upraised position, in registry with the window opening, and then outwardly into operative position, a slot closure operatively connected to the deflector to move therewith into the slot in the sill as the deflector reaches upraised position, and to return into the storage chamber as the deflector moves back through the slot, and a second slot closure operatively connected to that part of the deflector which is uppermost when the deflector is within the storage chamber, to close the slot when the deflector reaches its final position within the storage chamber.

16. In combination with an automobile door having a slotted window aperture and a storage chamber therebeneath, a window glass slidable from the storage chamber into the window aperture, a wind deflector disposed outwardly of the window glass and movable vertically through the slot from within the storage chamber into upraised position in the window aperture, cooperating guide means supporting the forward edge of the deflector from the door, throughout its vertical movement constraining it to movement in its own plane, and permitting movement of the deflector into outwardly swung operative position only after it has reached upraised position, means interengageable between the deflector and its guide means, when the deflector is swung outwardly into operative position, for supporting the deflector, a slot closure likewise guided for movement from the storage chamber into the deflector slot, means connecting the deflector and said slot closure to move the latter vertically as the deflector moves vertically, and permitting swinging of the deflector relative to the closure into operative position, an arm disposed beneath the closure, when in its lowermost position, means operable by the occupant of the car to swing said arm upward, thereby to raise the closure and the associated deflector, and yieldable means associated with said arm to maintain the same upraised while the deflector and closure are in operative position.

17. In combination with an automobile door having a slotted window aperture and a storage chamber therebeneath, a window glass slidable from the storage chamber into the window aperture, a wind deflector disposed outwardly of the window glass and movable vertically through the slot from within the storage chamber into upraised position in the window aperture, cooperating guide means supporting the forward edge of the deflector from the door, throughout its vertical movement constraining it to movement in its own plane, and permitting movement of the deflector into outwardly swung operative position only after it has reached upraised position, means interengageable between the deflector and its guide means, when the deflector is swung outwardly into operative position, for supporting the deflector, a slot closure likewise guided for movement from the storage chamber into the deflector slot, means connecting the deflector and said slot closure to move the latter vertically as the deflector moves vertically, and permitting swinging of the deflector relative to the closure into operative position, an arm disposed beneath the closure, when in its lowermost position, means operable by the occupant of the car to swing said arm upward, thereby to raise the closure and the associated deflector, means interengageable between said arm and the closure to hold the closure and the associated deflector down when the arm is down, and yieldable means for holding the arm down.

18. In combination with an automobile door having a slotted window aperture and a storage chamber therebeneath, a window glass slidable from the storage chamber into the window aperture, a wind deflector disposed outwardly of the window glass and movable vertically through the slot from within the storage chamber into upraised position in the window aperture, cooperating guide means supporting the forward edge of the deflector from the door, throughout its vertical movement constraining it to movement in its own plane, and permitting movement of the deflector into outwardly swung operative position only after it has reached upraised positon, means interengageable between the deflector and its guide means, when the deflector is swung outwardly into operative position, for supporting the deflector, a slot closure likewise guided for movement from the storage chamber into the deflector slot, means connecting the deflector and said slot closure to move the latter vertically as the deflector moves vertically, and permitting swinging of the deflector relative to the closure into operative position, an arm disposed beneath the closure, when in its lowermost position, means operable by the occupant of the car to swing said arm upward, thereby to raise the closure and the associated deflector, means interengageable between said arm and the closure to hold the closure and the associated deflector down when the arm is down, and yieldable means to hold the arm down, or to hold it upraised.

Signed at Seattle, King County, Washington, this 6th day of January, 1931.

ALBERT P. ROBINSON.